US012402081B2

United States Patent
Tripathi et al.

(10) Patent No.: US 12,402,081 B2
(45) Date of Patent: Aug. 26, 2025

(54) ENHANCED UPLINK POWER CONTROL

(71) Applicant: Samsung Electronics Co., Ltd., Suwon-si (KR)

(72) Inventors: Nishithkumar D. Tripathi, Parker, TX (US); Emad N. Farag, Flanders, NJ (US); Aristides Papasakellariou, Houston, TX (US); Joonyoung Cho, Portland, OR (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 17/464,573

(22) Filed: Sep. 1, 2021

(65) Prior Publication Data

US 2022/0078719 A1    Mar. 10, 2022

Related U.S. Application Data

(60) Provisional application No. 63/104,339, filed on Oct. 22, 2020, provisional application No. 63/076,159, filed on Sep. 9, 2020.

(51) Int. Cl.
*H04W 52/08* (2009.01)
*H04W 52/14* (2009.01)
*H04W 52/24* (2009.01)

(52) U.S. Cl.
CPC ....... *H04W 52/146* (2013.01); *H04W 52/242* (2013.01)

(58) Field of Classification Search
CPC ....... H04W 72/04; H04W 56/00; H04W 4/40; H04W 52/02; H04W 48/18; H04W 52/26;
(Continued)

(56) References Cited

U.S. PATENT DOCUMENTS

| 2015/0280945 | A1* | 10/2015 | Tan ...................... H04L 27/3411 375/267 |
| 2020/0274656 | A1 | 8/2020 | Gordaychik |
| 2022/0159741 | A1* | 5/2022 | Hoang .............. H04W 72/0453 |

FOREIGN PATENT DOCUMENTS

| KR | 10-2020-0085986 A | 7/2020 |
| WO | 2019170867 A1 | 9/2019 |
| WO | 2020165485 A1 | 8/2020 |

OTHER PUBLICATIONS

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

(Continued)

*Primary Examiner* — Tu X Nguyen

(57) ABSTRACT

Methods and apparatuses in a wireless communication system for a user equipment (UE) to perform a power management method. The method includes receiving, by the UE, one or more power parameters for a non-terrestrial network (NTN). The method also includes selecting a power management method from one of: a predictive transmit power method based on time and the distance between the UE and an NTN entity or a non-predictive transmit power method. The method also includes determining a power based on the power management method and the power management parameters. The method further includes transmitting a signal to the reception point using the power.

19 Claims, 9 Drawing Sheets

(58) Field of Classification Search
CPC ..... H04W 52/32; H04W 52/34; H04W 52/08;
H04W 74/08; H04W 74/00; H04W
74/0833; H04W 52/24; H04W 52/10;
H04W 4/029; H04W 84/06; H04W 52/52;
H04W 52/04; H04W 52/06; H04W 52/18;
H04W 92/04; H04W 88/16
See application file for complete search history.

(56) References Cited

OTHER PUBLICATIONS

"3rd Generation Partnership Project; Technical Specification Group Radio Access Network; Solutions for NR to support hon-terrestrial networks (NTN) (Release 16)", 3GPP TR 38.821 V16.0.0, Dec. 2019, 140 pages.

"5G; NR; Multiplexing and channel coding (3GPP TS 38.212 version 15.8.0 Release 15)", ETSI TS 138 212 V15.8.0, Jan. 2020, 106 pages.

"5G; NR; Physical channels and modulation (3GPP TS 38.211 version 15.8.0 Release 15)", ETSI TS 138 211 V15.8.0, Jan. 2020, 100 pages.

"5G; NR; Medium Access Control (MAC) protocol specification (3GPP TS 38.321 version 16.2.1 Release 16)", ETSI TS 138 321 V16.2.1, Nov. 2020, 156 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

International Search Report and Written Opinion of the International Searching Authority in connection with International Application No. PCT/KR2021/012305 issued Dec. 21, 2021, 7 pages.

Mediatek Inc., "Summary of 8.4.4 Other Aspects of NR-NTN", R1-2007060, 3GPP TSG RAN WG1 Meeting #102e, e-Meeting, Aug. 17-28, 2020, 42 pages.

* cited by examiner

ENHANCED UPLINK POWER CONTROL

CROSS-REFERENCE TO RELATED APPLICATIONS AND CLAIM OF PRIORITY

The present application claims priority to: U.S. Provisional Patent Application No. 63/076,159, filed on Sep. 9, 2020; and U.S. Provisional Patent Application No. 63/104,339, filed on Oct. 22, 2020. The content of the above-identified patent document is incorporated herein by reference.

TECHNICAL FIELD

The present disclosure relates generally to diverse networks and, more specifically, the present disclosure relates to enhanced uplink power control.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency, coverage, and quality of service are of paramount importance.

SUMMARY

The present disclosure generally relates to diverse networks and, more specifically, the present disclosure relates to enhanced uplink power control.

In another embodiment, a UE in a wireless communication system is provided. The UE includes a transceiver configured to receive one or more power management parameters. The UE also includes a processor configured to select a power management method from one of a predictive transmit power method based on a distance between the UE and a reception point, or a non-predictive transmit power method. The processor further determines a power based on the power management method and the power management parameters. The transceiver further transmits a signal to the reception point using the power In one embodiment, a base station (BS) in a wireless communication system is provided. The BS includes a processor and a transceiver. The processor is configured to obtain power management parameters; determine, based on the power management parameters, a power transmit level; and generate a power transmit message comprising the power transmit level. The transceiver is configured to transmit, to a user equipment (UE), the power transmit message configured to enable the UE to: select a power management method from one of a predictive transmit power method based on a distance between the UE and a reception point, or a non-predictive transmit power method; and determine a power based on the power management method and the power management parameters. The transceiver further receives a signal to the reception point using the power.

In yet another embodiment, a method of a user equipment (UE) a wireless communication system is provided. The method includes receiving one or more power management parameters. The method also includes selecting a power management method from one of: a predictive transmit power method based on time and the distance between the UE and an NTN entity or a non-predictive transmit power method. The method also includes determining a power based on the power management method and the power management parameters. The method further includes transmitting a signal to the reception point using the power.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
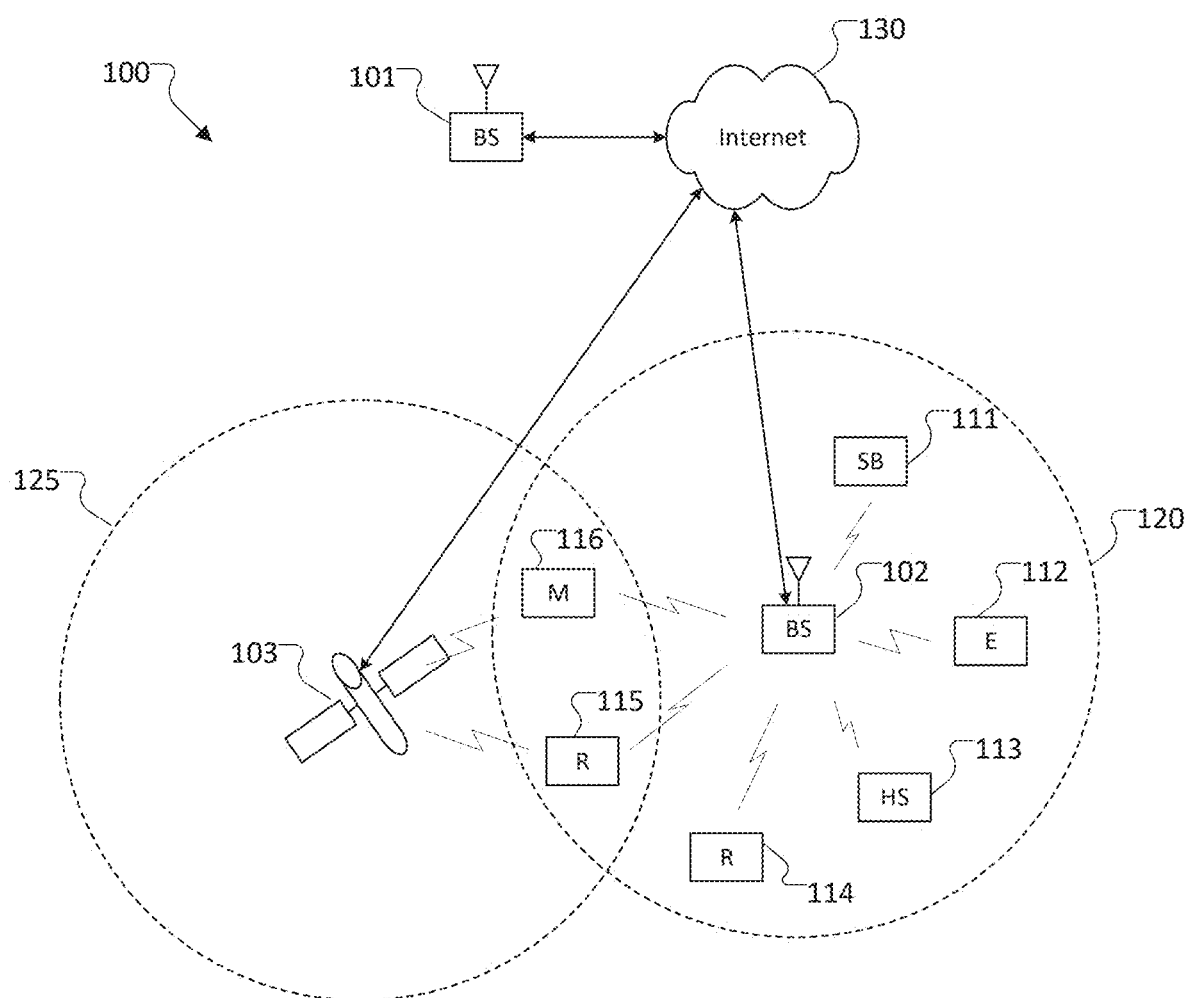
FIG. 1 illustrates an example wireless network according to embodiments of the present disclosure.
Figure 2:
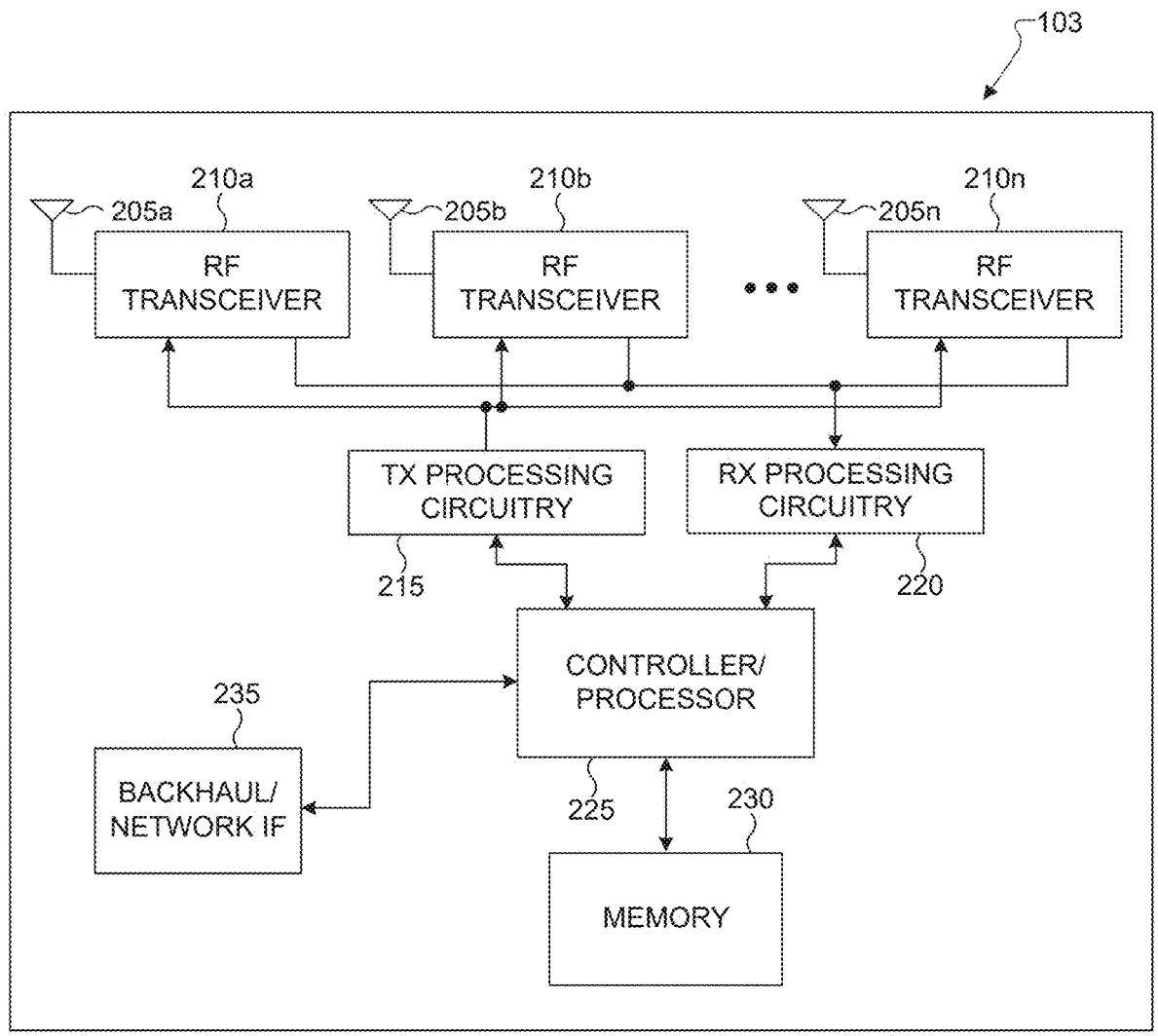
FIG. 2 illustrates an example gNB according to embodiments of the present disclosure.
Figure 3:
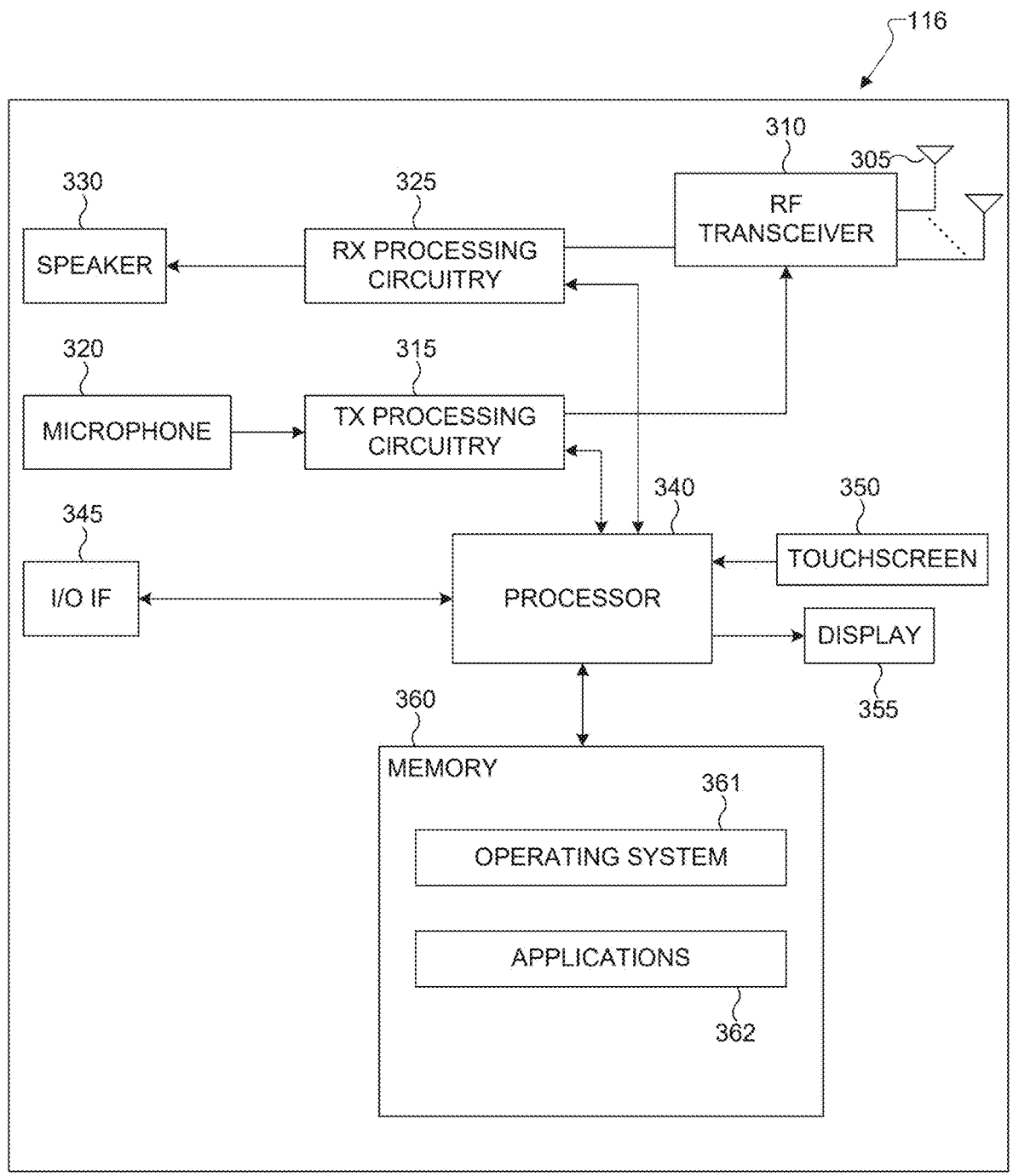
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In certain embodiments, the gNB 103 is a non-terrestrial BS. For example, gNB 103 can be a satellite positioned in a geosynchronous earth orbit (geostationary orbit or GEO) or in a low earth orbit (LEO).

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The coverage area 125 provided by gNB 103 can be part of a non-terrestrial network (NTN). The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for enhanced uplink power control for a non-terrestrial network. In certain embodiments, and one or more of the gNBs 101-103 includes circuitry, programing, or a combination thereof for enhanced uplink power control for a non-terrestrial network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 103 according to embodiments of the present disclosure. The embodiment of the gNB 103 illustrated in FIG. 2 is for illustration only, and the gNBs 101 and 102 of FIG. 1 could have the same or similar configuration. However, gNBs come in a wide variety of configurations, and FIG. 2 does not limit the scope of this disclosure to any particular implementation of a gNB.

As shown in FIG. 2, the gNB 103 includes multiple antennas 205a-205n, multiple RF transceivers 210a-210n, transmit (TX) processing circuitry 215, and receive (RX) processing circuitry 220. The gNB 103 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 103. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 103 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 103 to communicate with other devices or systems over a backhaul connection or over a network. The interface 235 could support communications over any suitable wireless connection(s). When disposed as part of a terrestrial network, such as gNB 101 and gNB 102, The interface 235 could support communications over any suitable wired or wireless connection(s). For example, when the gNB 103 is implemented as part of a cellular communication system (such as one supporting 5G/NR, LTE, or LTE-A), the interface 235 could allow the gNB 103 to communicate with other gNBs over a wireless backhaul connection while gNB 101 and gNB 102 can communicate with other gNBs over a wired or wireless backhaul connection. When the one or the gNBs 101-103 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 103, various changes may be made to FIG. 2. For example, the gNB 103, and respectively gNB 101 and 102 as part of terrestrial networks, could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

Traditional eNBs and gNBs support several hundred or a few thousand active RRC connections. To efficiently support a massive number of low-rate and delay-tolerant services along with traditional smartphones, a paradigm shift is needed; each relevant cell needs to have massive processing capability. With the wireless networks being virtualized, cloud-based computing and storage resources would facilitate implementation of eNBs/gNBs capable of supporting hundreds of thousands of active connections.

In the present disclosure, a system and method are provided to enhance uplink power control for a network, such as non-terrestrial network (NTN). Embodiments of the present disclosure provide a more effective power control, which will enhance the reliability of uplink data transfer, increase UE battery life, and reduce the overall uplink interference. Certain embodiments of the present disclosure provide mechanisms to reduce the UL scheduling delay in an NTN and does not require any significant increase in the radio resource utilization. In the typical UL scheduling procedure, there is an overall delay of (2*Round Trip Delay). Embodiments of the present disclosure reduce the delay by 50% with a simple implementation.

In embodiments of the present disclosure, one or multiple approaches described below can be implemented to realize the concept of flexible quality of service (QoS) for diverse networks including a NTN and a high-capacity network. A geosynchronous equatorial orbit (GEO) satellite and high-altitude platform station (HAPS) with a fixed cell on earth are good candidates to support a massive number of delay-tolerant devices and Apps.

For the NTN architecture, several embodiments are available. In one embodiment, a transparent GEO satellite payload can be used, where all the radio protocol stack processing is done at the ground-based eNB or gNB. Such eNB or gNB can make use of high-performance monolithic resources or cloud-based processing and memory resources (e.g., compute resources and storage resources of a cloud network).

In certain embodiments, for the NTN architecture, gNB 103 comprises a gNB-distributed unit (gNB-DU) disposed on the satellite and a gNB-centralized unit (gNB-CU) disposed on the ground. In such case, the gNB-CU can control the amount of data being sent to the gNB-DU based on gNB-DU memory capabilities. In an implementation-specific manner, the gNB-CU can support most of the storage (e.g., at the packet data convergence protocol (PDCP) layer) to alleviate any significant memory requirements on the gNB-DU.

In an NTN, a traditional closed loop power control may be ineffective because of long propagation delays. There is a long delay between (i) the instant the gNB determines a power control command and (ii) the instant the UE's uplink signal (e.g., PUSCH, PUCCH, or SRS) with an updated power level is received at the gNB. Furthermore, there is a long delay between (i) the instant when the (downlink) path loss is measured by the UE and (ii) the instant when the gNB receives the UE's signal. Non-GEO NTN cells may be moving, leading to increased uncertainty about the validity of traditional closed-loop power control used in a Terrestrial Network (TN). The knowledge of various delays, the platform's ephemeris data, the UE's location, and the Reference Point coordinates can be used for more accurate power control. The traditional closed-loop power control is ineffective for PUSCH, PUCCH, and SRS when the UE is in the RRC_CONNECTED mode due to long delays in an NTN. Hence, uplink power control enhancements are needed for an NTN.

Figure 4:
FIG. 4 illustrates an example overall mechanism of management of uplink power Control according to embodiments of the present disclosure.

FIG. 4 illustrates an example overall mechanism of management of uplink power control according to embodiments of the present disclosure. An embodiment of the overall mechanism 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions.

In the example shown in FIG. 4, an uplink power control processor 405 receives NTN Type, power configurations, capabilities of UE 116 and gNB 103, Delays and Quality criteria 410. The uplink power control processor 405 outputs target UL channels/signals, transmit power adjustment mode (implicit at UE, distributed between UE and network), signaling framework, and adjustments 415.

Figure 5:
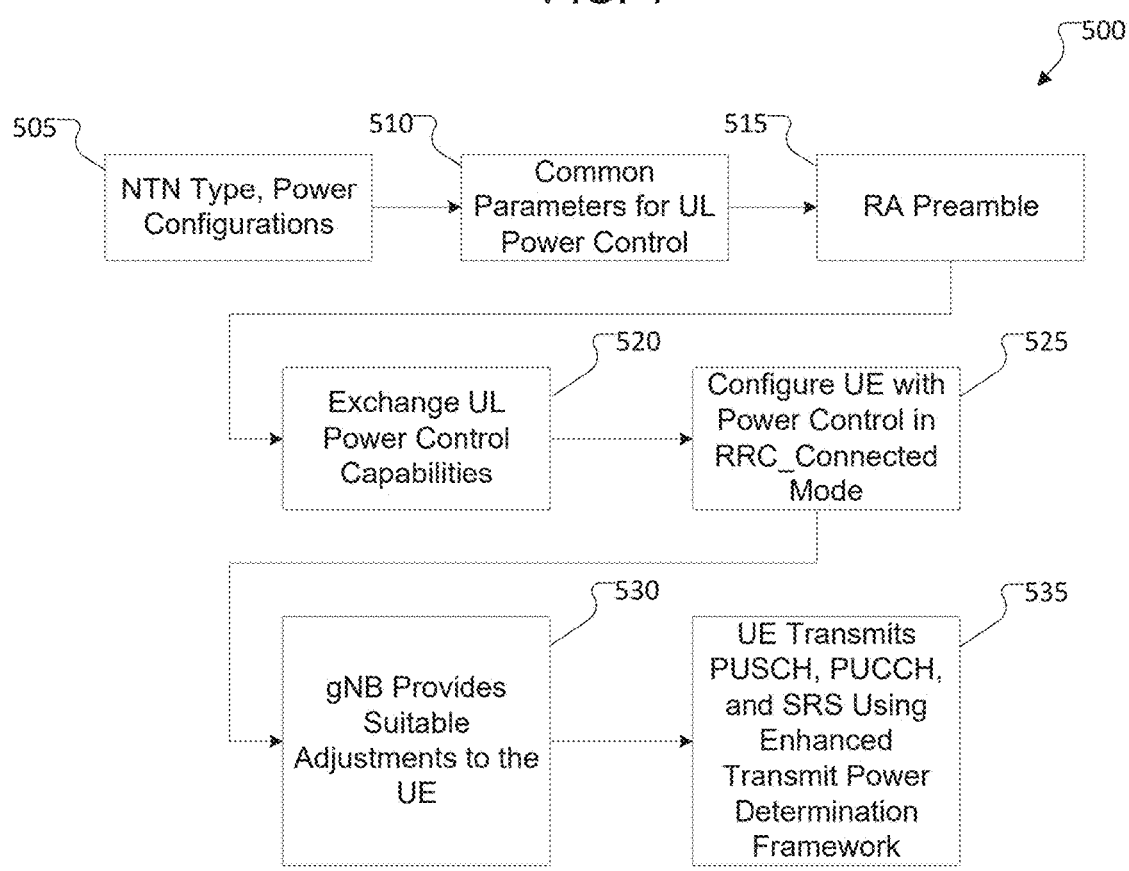
FIG. 5 illustrates an example management of an uplink power control according to embodiments of the present disclosure.

FIG. 5 illustrates an example management of an uplink power control according to embodiments of the present disclosure. An embodiment of the overall steps 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

In operation 505, the platform, the NTN-GW, and gNB exchange power configurations. The platform can be a satellite, gNB-DU, or HAPS, and the gNB can be gNB 102, gNB 103, or a gNB-CU. In operation 510, gNB 103 provides parameters for UL power control to UE 116, for example, by system information. In operation 515, UE 116 transmits an RA preamble using enhanced transmit power calculations. In operation 520, UE 116 and the network exchanged UL power control capabilities. In response, the network configures UE 116 with power control in the RRC_Connected mode in operation 525. In operation 530, gNB 103 provides suitable adjustments to UE 116. In operation 535, UE 116 transmits PUSCH, PUCCH, and SRS using an enhanced transmit power determination framework.

Table T1 specifies examples of various instants and delays relevant to one or more embodiments of the invention. While Table T1 assumes a transparent payload with gNB 103 on the ground, suitable adjustments can be made in case of a regenerative payload, where either the entire gNB 103 is on the platform or the gNB-DU is on the platform and the gNB-CU is on the ground.

TABLE T1

Examples of Time and Delay Perspectives in an NTN

| Time | Description |
|---|---|
| T1 | The gNB sends a SIB containing PRACH power related parameters such as referenceSignalPower and preambleReceivedTargetPower for a Power Reference Point (e.g., gNB, NTN-GW, or platform such as a satellite or HAPS). |
| T2 | The NTN GW receives the SIB containing PRACH power related parameters from the gNB. T2 = T1 + Tgw-gnb_gnb_to_gw_td, where Tgw-gnb_gnb_to_gtw_td is the transport delay from the gNB to the NTN GW. |

TABLE T1-continued

Examples of Time and Delay Perspectives in an NTN

| Time | Description |
|---|---|
| T3 | The NTN-GW transmits the SIB containing PRACH power related parameters to the platform. T3 = T2 + Tgw_gw_to_pl_tx, where Tgw_gw_to_pl_tx is the processing time needed by the NTN GW to start transmitting the SIB containing the PVT information to the platform. |
| T4 | The platform receives the SIB containing PRACH power related parameters. T4 = T3 + Tfl_gw_to_pl_pd, where Tfl_gw_to_pl_pd is the propagation delay on the feeder link delay from the NTN GW to the platform. |
| T5 | The platform transmits the SIB containing PRACH power related parameters to UEs. T5 = T4 + Tpl_pl_to_UE_tx, where Tpl_pl_to_UE_tx is the processing time needed by the platform to transmit the SIB containing PRACH power related parameters to UEs in the NTN cell. |
| T6 | The UE receives the SIB containing PRACH power related parameters from the platform. T6 = T5 + Tsl_pl_to_UE_pd, where Tsl_pl_to_UE_pd is the propagation delay on the service link (or the access link) from the platform to the UE. |
| T7 | The gNB sends the synchronization signal-physical broadcast channel (SS-PBCH) Block (SSB) to the NTN-GW. |
| T8 | The NTN-GW transmits the SS-PBCH Block to the platform. |
| T9 | The platform transmits the SS-PBCH Block to the UE. |
| T10 | The UE measures the power of the received SS-PBCH Block. |
| T11 | The UE transmits a signal (e.g., a Random Access preamble) to the platform. |
| T12 | The platform receives the UE's signal. T12 = T11 + Tsl_UE_to_pl_pd, where Tsl_UE_to_pl_pd is the propagation delay on the service link (or the access link) from the UE to the platform. |
| T13 | The NTN GW receives the UE's signal. T13 = T12 + Tpl_pl_to_fl_tx + Tfl_pl_to_fl_pd, where Tpl_pl_to_fl_tx is the processing time needed by the platform to start sending the UE signal to the NTN GW and Tfl_pl_to_gw_pd is the propagation delay on the feeder link delay from the platform to the NTN GW. |
| T14 | The gNB receives the UE's signal from the NTN GW. T14 = T13 + Tgw_gw_to_gnb_send + Tgw-gnb_gw_to_gnb_td, where Tgw_gw_to_gnb_send is the processing time needed by the NTN GW to transmit the UE's signal to the gNB and Tgw-gnb_gw_to_gnb_td is the transport delay from the NTN GW to the gNB. |

Figure 6:
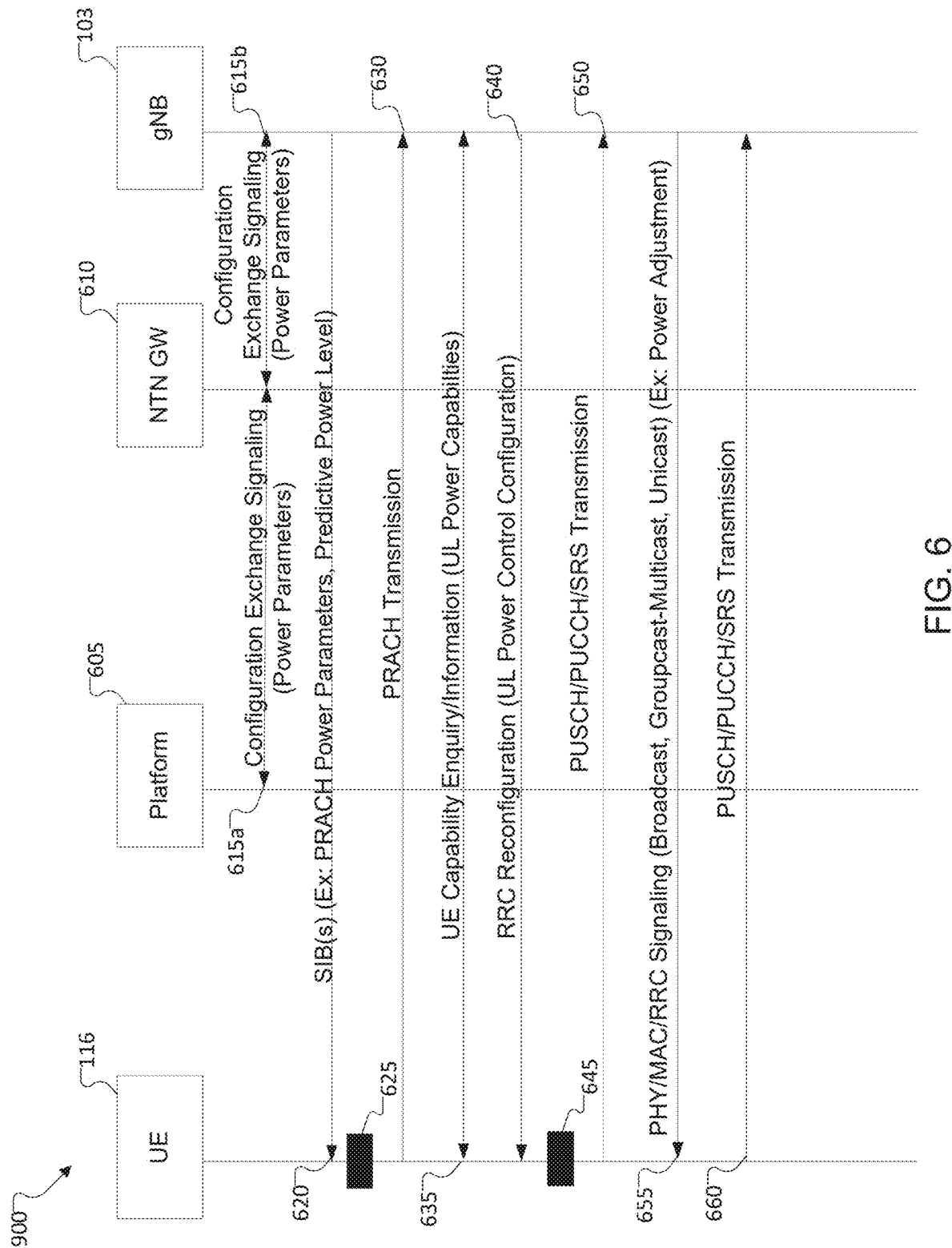
FIG. 6 illustrates a signaling flow for management of uplink power control according to embodiments of the present disclosure.

FIG. 6 illustrates a signaling flow for management of uplink power control according to embodiments of the present disclosure. An embodiment of the signaling flow for UE-radio network interactions 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, in certain embodiments, the signaling flow for UE-radio network interactions 600 occurs between or among UE 116, platform 605, NTN GW 610, and gNB 103. In an example approach, the platform 605, the NTN-GW 610, and gNB 103 respectively exchange signaling messages 615a, 615b to convey configuration parameters to facilitate power management. In certain embodiments, the platform 605 conveys the power amplifier gains applied to the signal received on the access or service link before the platform 605 transmits the signaling message 615a to the NTN GW 610 on a feeder link. In certain embodiments, the platform 605 conveys the power amplifier gains applied to the signal received on the feeder link before the platform 605 transmits a signal to UEs on the access/service link. In certain embodiments, the platform 605 conveys the receive and transmit antenna gain characteristics for the access/service link and/or the feeder link, to the NTN GW 615.

In certain embodiments, when the platform 605, NTN-GW 610, and gNB 103 respectively exchange signaling message 615b, NTN-GW 610 conveys the power amplifier gains applied to the signal received on the feeder link before NTN-GW 610 sends the signal to gNB 103 on the feeder link. In an example approach, NTN GW 610 also coveys to gNB 103 the configuration NTN-GW 610 has received from the platform 605. In certain embodiments, NTN-GW 615 conveys the power amplifier gains applied to the signal received from gNB 103 before NTN-GW 610 transmits the signal to the platform 605 on the feeder link. In certain embodiments, NTN-GW 610 conveys the receive and transmit antenna gain characteristics for the feeder link to the platform 605, and to gNB 103 if a wireless interface is used between NTN-GW 610 and gNB 103.

In conveying the signaling message 615a and 615b, the platform 605, NTN-GW 610, and gNB 103 exchange signaling messages 615a and 615b to negotiate or determine the interpretation of the power related parameters being conveyed to UEs by gNB 103 via broadcast (e.g., System Information), groupcast-multicast, and/or unicast signaling.

In certain embodiments, the power configuration parameters are exchanged in the signaling message 615a and 615b among the platform 605, NTN GW 610, and gNB 103 are performed semi-statically or dynamically to reflect any changes to the nominal parameter settings. Such changes can be periodically sent or based on relevant events.

In response, gNB 103 transmits uplink power control related parameters to UE 116 in suitable System Information message(s), such as system information blocks (SIBs) 620, to enable UE 116 to determine the transmit power levels of uplink channels and signals, such as PRACH, PUSCH, PUCCH, and SRS. In certain embodiments, gNB 103 coveys UE 116: (i) preambleReceivedTargetPower; and (ii) referenceSignalPower (e.g., SS-PBCH-Block-Power), that can be referenced at one or more of gNB 103, the NTN GW 610, or the platform 605, based on different implementations. In one example implementation, preambleReceivedTargetPower and SS-PBCH-Block-Power are specified in a SIB IE such as servingCellConfigCommonSIB. In another example implementation, preambleReceivedTargetPower and SS-PBCH-Block-Power are configured or updated to a UE via dedicated RRC signaling using the IE "servingCell-ConfigCommon" that includes cell-specific parameters common for UEs in the cell. For example, such dedicated RRC signaling can be utilized in cases such as handover and RRC connection reestablishment, and beam failure recovery.

In certain embodiments, gNB 103 can explicitly identify, to UE 116, the power reference point. In certain embodiments, the reference point for the power calculations may be implicitly determined by UE 116, such as based on the NTN type. The reference point can help UE 116 to determine a suitable instant at which the signal will be received at a given reference point, such as the platform 605, NTN GW 610, and gNB 103.

In certain embodiments, when sending the SIBs 620, gNB 103 indicates if UE 116 should or can use a predictive transmit power method to determine a transmit power for UE 116. An example of a predictive transmit power method is further described herein below with respect to operation 625. For example, a predictive transmit power is an expected or calculated power level for a future time and a non-predictive transmit power is a current power level using regular power controls. Such indication can be provided in an enhanced version of an existing SIB or new NTN-specific SIB. In certain embodiments, the predictive method can be separately specified for PRACH and non-PRACH (e.g., PUSCH, PUCCH, and SRS). For example, one predictive transmit method can be used for PRACH, another predictive transmit power method can be used for PUSCH, and yet another predictive transmit method can be used for PUCCH. In certain embodiments, the same predictive transmit method can be used for PUSCH, PUCCH, and SRS.

In certain embodiments, depending on the NTN type, the predictive transmit power method can be turned off and the traditional non-predictive transmit power is used. Such indication to use or not use the predictive method is configured or updated to UE 116 by gNB 103 in System Information and/or RRC dedicated signaling and/or MAC CE signaling and/or L1 control (DCI) signaling in an explicit method. In another "implicit" approach, UE 116 decides to use the predictive method based on the NTN Type, which can be explicitly specified by gNB 103 or inferred by UE 116 based on the platform ephemeris. For example, in case of an NTN Type=GEO satellites, traditional non-predictive transmit power method can be used. In contrast, in case of an NTN Type=LEO satellites, a new predictive transmit power method can be used.

In certain embodiments, when the NTN-centric uplink power control parameters are specified by gNB 103, the periodicity and the format of the relevant SIB(s) are defined to be different from those used for a Terrestrial Network (TN). For example, a more reliable reception for a new or enhanced SIB can be achieved by using solutions such as a more robust transmission format (e.g., a more conservative modulation and coding scheme combination) and TTI bundling (e.g., the use of multiple consecutive TTIs).

In operation 625, UE 116 determines the transmission power for a first PRACH preamble based on preambleReceivedTargetPower and SS-PBCH-Block-Power. Traditionally, the UE 116 calculates the transmit power of the preamble as the sum of preambleReceivedTargetPower and Path Loss, where Path Loss is estimated as (referenceSignalPower−higher layer filtered RSRP). The transmit power level is limited to the maximum transmit power allowed by the network and a power class of UE 116 (i.e., UE's 116 own power class) according to:

$$P_{tx} = \min\{P_{max}, \text{preambleReceivedTargetPower} + \text{PathLoss}\} \quad (1)$$

$$\text{PathLoss} = \text{referenceSignalPower} - \text{RSRP} \quad (2)$$

In certain embodiments, the preambleReceivedTargetPower is defined for a suitable Power Reference Point, such as a target received power at the platform 605, and PathLoss can be calculated using a non-predictive or predictive transmit power method.

In certain embodiments, when the platform 605 is moving, such as when the platform 605 is included in or on a Non-Geo Synchronous Orbiting satellite, UE 116 estimates the instant tSSB when the SSB (i.e., SS/PBCH Block or synchronization signal block (SSB)) was transmitted. The radio environment at the instant tSSB is compared with the radio environment at the instant when the UE's 116 preamble is expected to be received at the power reference point (tReference). For example, the platform 605 can be used as a Power Reference Point. Other examples of Power Reference Points are the NTN GW 610 and gNB 103. In certain embodiments, UE 116 uses the platform's positions at tSSB and tReference and a predictive transmit power method to estimate the signal loss at tReference.

In one example predictive transmit power method, UE 116 uses the platform-UE distances to predict the signal loss at tReference. In another example predictive transmit power method, UE 116 uses a history of path loss or signal loss measurements to predict the path loss at tReference. In this method, suitable filtering or interpolation/extrapolation method is specified for UE 116. In yet another example predictive transmit power method, UE 116 uses the gNB-provided expected signal loss difference between tSSB and tReference. Then, gNB 103 broadcasts or groupcasts/multicasts the specific predictive transmit power method to be used by UE 116 in one approach. In another approach, a specific predictive transmit power method is made mandatory for UE 116.

In certain embodiments, a pathloss distance exponent n can be specified in the system specification, and/or configured or updated by RRC signaling (cell-specific or UE-dedicated) and/or MAC CE signaling and/or L1 control (DCI) signaling wherein, for example, an additional pathloss estimate is calculated according to:

$$\text{Additional } PL = 10 \cdot n \cdot \log_{10} \frac{d(tReference)}{d(tSSB)} \quad (3)$$

In Equation 3, d(tReference) is the distance between the platform 605 and UE 116 at time tReference, and d(tSSB) is the distance between the platform 605 and UE 116 at time tSSB. In the illustrated example, n=2.

In another example, a pathloss distance exponent n, and a factional pathloss exponential coefficient α can be specified in the system specification, and/or configured or updated by RRC signaling (cell-specific or UE-dedicated) and/or MAC CE signaling and/or L1 control (DCI) signaling, wherein an additional pathloss estimate is calculated according to:

$$\text{Additional } PL = 10 \cdot \alpha \cdot n \cdot \log_{10} \frac{d(tReference)}{d(tSSB)} \quad (4)$$

In certain embodiments, a is provided by msg3-Alpha for a Msg3 PUSCH transmission, or msgA-Alpha for a PUSCH transmission associated with Type-2 random access procedure, or p0-PUSCH-Alpha in ConfiguredGrantConfig for a configured grant PUSCH transmission, by a set of alpha in P0-PUSCH-AlphaSet indicated by a respective set of p0-PUSCH-AlphaSetId for active UL BWP b of carrier f of serving cell c.

In certain embodiments, in operation 625, UE 116 estimates the overall path loss to be PL(T) at a future instant T using the following formula:

$$PL(T) = \left(\frac{PL(t2) - PL(t1)}{t2 - t1}\right)T + \left[PL(t2) - \left(\frac{PL(2) - PL(t1)}{t2 - t1}\right)t2\right], \quad (2)$$

In Equation 5, t1 and t2 are historical times and PL(t1) and PL(t2) are estimated path loss values at time t1 and t2, respectively.

In operation 625, for transmission of the second and subsequent preamble, UE 116 applies traditional power step up sizes. In certain embodiments, based on the explicit network indication or in an implicit manner, UE 116 determines the path loss using the predictive transmit power method for the first and subsequent preamble transmissions.

In certain embodiments, in operation 625, UE 116 uses the traditional path loss estimation and uses an adjustment of a (the fractional path loss parameter) to adjust the effective path loss. The value of a can be defined as a function of time difference between tSSB and tReference or the platform-UE distance in an example embodiment of the invention.

UE 116 transmits the PRACH preamble 630 and adjusts its preamble transmit power using the traditional open loop power control mechanism along with the predictive transmit power method enhancement when applicable. In operation 625 and the PRACH 630 transmission, the predictive transmit power method is applicable to both the 4-step random access procedure and 2-step random access procedure as well as to contention-based random access and contention-free random access. For example, UE 116 uses the predictive method to determine the transmit power of msgA when the 2-step RA is used instead of the 4-step RA.

UE 116 and gNB 103 exchange dedicated RRC signaling messages 635, such as UECapabilityEnquiry and UECapabilityInformation. In certain embodiments, gNB 103 can enquire about the UE's capability, or the UE can provide a capability as part of general capability information, of the predictive transmit power method for the RRC_Connected state, which is applicable for channels and signal such as PUSCH, PUCCH, and SRS. In certain embodiments, gNB 103 may also inquire UE 116 about UE's 116 capabilities related to specific types of adjustments, such as: (i) an adjustment that reflects the subcarrier spacing (SCS) and the number of Physical Resource Blocks (PRBs); (ii) an adjustment that reflects the path loss; (iii) an adjustment that reflects the transport format or the number of bits; (iv) long-term and larger power step adjustment; (v) an adjustment that reflects the time difference tSSB and tReference; and (vi) an adjustment that reflects the quality of the radio connection and/or the quality of service of the QoS Flows. In certain embodiments, UE 116 may specify its capabilities for one or more of these adjustments. In certain embodiments, one or more of these adjustments is mandatory for UE 116.

In certain embodiments, gNB 103 specifies the uplink power control parameters via unicast dedicated RRC signaling 640 such as RRC Reconfiguration message. In certain embodiments, broadcast or groupcast/multicast signaling is used. In certain embodiments, the uplink power control parameters can be updated by MAC CE signaling and/or L1 control (DCI) signaling. In certain embodiments, gNB 103 specifies the type of predictive transmit power method that UE 116 should use. The nominal offsets for PUSCH, PUCCH, and SRS are specified by gNB 103 to ensure their reliable detection at gNB 103.

When gNB-assisted predictive transmit power method is used, gNB 103 specifies the expected path loss for the given Power Reference Point at a future instant relative to a past instant such as transmission instant of the SSB transmission. Such path loss reflects the impact of distance-based path loss and shadow fading. In certain embodiments, gNB 103 specifies the future instant and the associated path loss.

In operation 645, UE 116 determines specific types of adjustments, such as: (i) an adjustment that reflects the subcarrier spacing (SCS) and the number of Physical Resource Blocks (PRBs) or channel bandwidth Δ(SCS, RB); (ii) an adjustment that reflects the path loss Δ(PL); (iii) an adjustment that reflects the transport format or the number of bits (and PUCCH format) Δ(TF, Format); (iv) long-term power step adjustment Δ(LongTerm), (v) an adjustment that reflects the time difference tSSB and tReference Δ(TimeDifference), (see operation 625 for examples); and (vi) an adjustment that reflects the quality of the radio connection and/or the quality of service of the QoS Flows Δ(Quality). The specific types of adjustments can be calculated according to:

$$P_{tx} = \min\{P_{max}, P_{nominal} + \Delta(SCS, RB) + \Delta(PL) + \Delta(TF, Format) + \Delta(LongTerm) + \Delta(TimeDifference)\}, \quad (6)$$

In Equation 6, Ptx is the transmit power of PUSCH/PUCCH/SRS, Pmax is the maximum transmit power and Pnominal is the nominal offset for a given channel/signal (e.g., PUSCH, PUCCH and SRS). In certain embodiments, one or more adjustments are used in the equation above by UE 116.

In support of the adjustments (i) to (vi), gNB 103 may specify which adjustments need to be used by UE 116 via broadcast, groupcast/multicast, or unicast signaling.

In certain embodiments, the long-term power adjustment is intended to cover the time period longer than the round trip time. This adjustment is described with respect to PHY/MAC/RRC Signaling 655 below.

In certain embodiments, the time difference based adjustment can use the predictive transmit power methods mentioned in operation 625.

In certain embodiments, the quality-based adjustment can be based on the number of HARQ ACKs/NACKs associated with UE's 116 PUSCH transmission. In an example implementation, as part of the configuration specified in a cell-specific or UE-specific manner, gNB 103 specifies a number, or percentage, of ACKs or NACKs in a certain time period and associated increase/decrease of the transmit power level. For example, when a NACK is implied for a PUSCH transmission, UE 116 increases the transmit power level by X decibels (dB). Similarly, when one or more ACKs are implied for PUSCH transmissions, UE decreases the transmit power level by Y dB. For example, when a percentage of HARQ-ACK information with NACK value for TBs in PUSCH transmissions within a time period T is larger than P, the UE increases a transmit power by X dB, wherein T and P can be provided to the UE by higher layers and a start of each time period can be also provided by higher layers or determined in the specification of the system operation such as by a modulo faction on the period T and the system frame number. In certain embodiments, gNB 103 specifies a set of such ACK/NACK-based adjustments via RRC signaling.

UE 116 transmits PUSCH/PUCCH/SRS 650 at the power level determined in operation 645.

In performing the PHY/MAC/RRC Signaling 655, gNB 103 determines an adjustment to be made to the UE's 116 transmit power to bring the UE's 116 received power level to a gNB-determined target value such that target power control performance is achieved from gNB's 103 perspective (e.g., a certain block error rate or a certain interference level per gNB implementation). Compared to the traditional power control step sizes, larger steps and/or finer resolutions of steps (e.g., more step sizes as available options) are utilized in an example implementation. In one approach, the adjustment is specified via PHY signaling (e.g., via DCIs). In another approach, the adjustment is specified via MAC signaling (e.g., via a MAC Control Element). In yet another approach, the adjustment is specified via RRC signaling (e.g., via an RRC Reconfiguration message, potentially optimized for an NTN).

$$P_{PUSCH,b,c}(i,j,q_d,l) = \min\left\{ \begin{array}{c} P_{CMAX}, \\ P_{O_{PUSCH},b,f,c}(j) + 10\log_{10}\log(2^\mu \cdot M_{RB,f,c,b}^{PUSCH}(i)) + \alpha_{b,f,c}(j)PL_{b,f,c}(q_d) + \\ \text{Additional } PL + \Delta_{TF,b,f,c}(q_d) + f_{b,f,c}(i,l) \end{array} \right\} \quad (7)$$

Where:

$$\text{Additional } PL = 10 \cdot \alpha \cdot n \cdot \log_{10} \frac{d(tReference)}{d(tSSB)} \quad (8)$$

Similar equations are added for PUCCH–SRS and PRACH (in a step related to PRACH). An alternative equation is:

$$P_{PUSCH,b,c}(i,j,q_d,l) = \min\left\{ \begin{array}{c} P_{CMAX}, \\ P_{O_{PUSCH},b,f,c}(j) + 10\log_{10}\log(2^\mu \cdot M_{RB,f,c,b}^{PUSCH}(i)) + \alpha_{b,f,c}(j)PLT_{b,f,c}(q_d) + \\ \Delta_{TF,b,f,c}(q_d) + f_{b,f,c}(i,l) \end{array} \right\} \quad (10)$$

Where the total pathloss is the sum of the measured pathloss+the additional pathloss:

$$PLT_{b,f,c}(q_d) = PL_{b,f,c}(q_d) + \text{Additional } PL \quad (11)$$

Where, $$\text{Additional } PL = 10 \cdot n \cdot 10\log_{10} \frac{d(tReference)}{d(tSSB)} \quad (12)$$

In performing the PHY/MAC/RRC Signaling 655, the adjustments can be periodic or aperiodic.

In performing the PHY/MAC/RRC Signaling 655, the adjustment may be specified for one or more (including all) of PUSCH, PUCCH, and SRS.

Then, UE 116 transmits the PUSCH/PUCCH/SRS 660 using the adjustment specified by the gNB in the PHY/MAC/RRC Signaling 655.

While the example depicted in FIG. 6 uses a transparent payload gNB 103 to explain various embodiments of the disclosure, these concepts are usable in other payload types such as the regenerative gNB on the platform or gNB-DU on the platform. A suitable indication about such payloads can be provided to the UE implicitly or explicitly (e.g., via an NTN Type)

Figure 7:
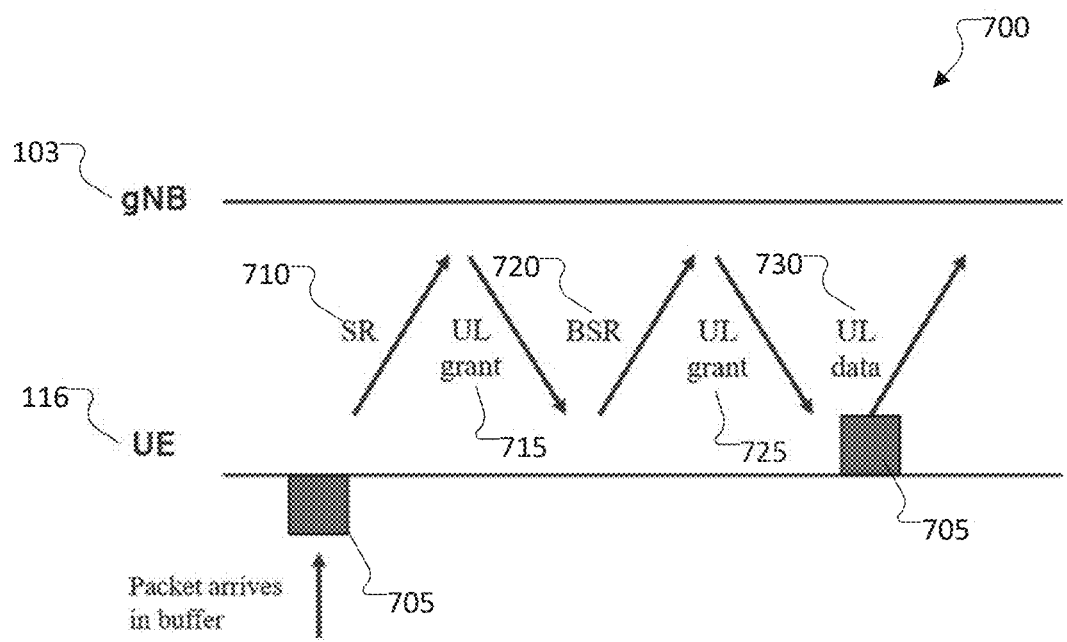
FIG. 7 illustrates scheduling delay in a non-terrestrial network in a typical uplink scheduling procedure according to embodiments of the present disclosure.

FIG. 7 illustrates scheduling delay in an NTN in a typical UL scheduling procedure according to embodiments of the present disclosure. The embodiment scheduling 700 shown in FIG. 7 is for illustration only. Other embodiments could be used without departing from the scope of the present disclosure.

In the example shown in FIG. 7, data 705 for transmission arrives at a buffer of UE 116. UE 116 transmits a scheduling request (SR) 710 to gNB 103. In response, gNB 103 provides a first UL grant 715 allocating a portion of bandwidth to enable UE 116 to provide an indication for a buffer status. UE 116 transmits a Buffer Status Report (BSR) 720. In response, gNB 103 transmits a second UL grant 725 to allocate resources for UE 116 to transmit the additional data 705. In accordance with the UL grant 725, UE 116 transmits the data 705 via an UL data transmission 730.

If gNB 103 knows about the UE 116 buffer status earlier (e.g., at the time of Scheduling Request), gNB 103 can allocate a suitable amount of radio resources in the first UL Grant 715 itself, rather than waiting for a regular BSR 720. Certain embodiments of the disclosure provide an efficient and reliable way so that (SR+BSR) can be essentially conveyed without sending an actual BSR 720 with SR 710.

Figure 8:
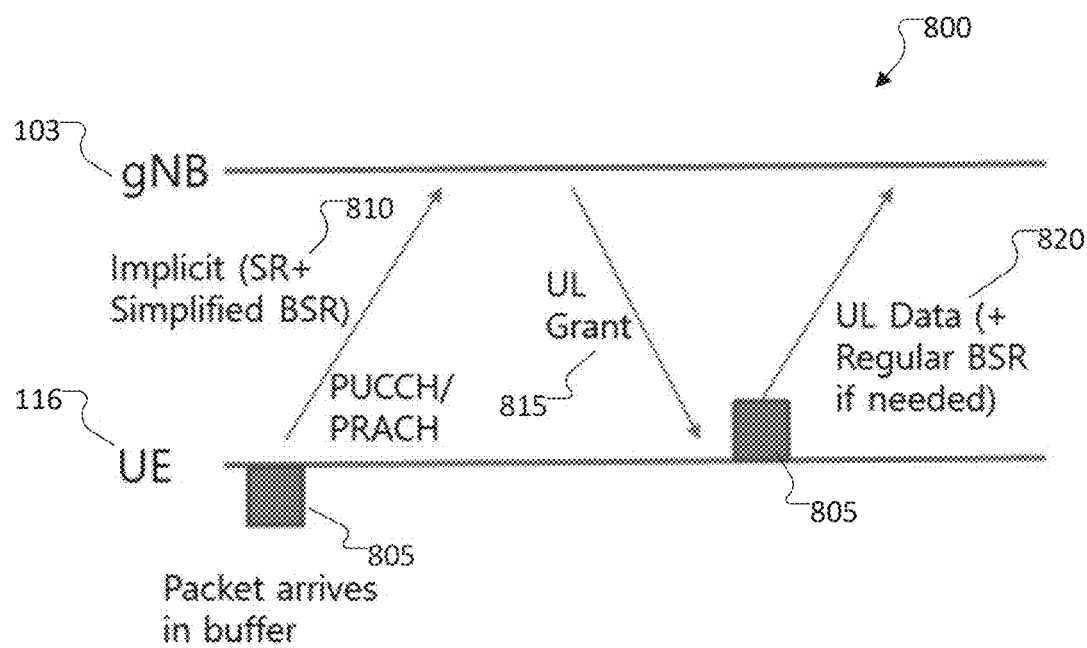
FIG. 8 illustrates reducing the scheduling delay in a non-terrestrial network using an enhanced uplink scheduling procedure according to embodiments of the present disclosure.

FIG. 8 illustrates reducing the scheduling delay in an NTN using an enhanced UL scheduling procedure according to embodiments of the present disclosure. The embodiment scheduling 800 shown in FIG. 8 is for illustration only. Other embodiments could be used without departing from the scope of the present disclosure.

In the example shown in FIG. 8, data 805 for transmission arrives at a buffer of UE 116. UE 116 transmits an implicit SR and BSR 810 to gNB 103. In response, gNB 103 replies with an UL grant 815 allocating resources for UE 116 to transmit the data 805. In accordance with the UL grant 815, UE 116 transmits the data 805 via an UL data transmission 820. The key idea the example shown in FIG. 8 is to convey the Scheduling Request and buffer status information indirectly and reliably.

Figure 9:
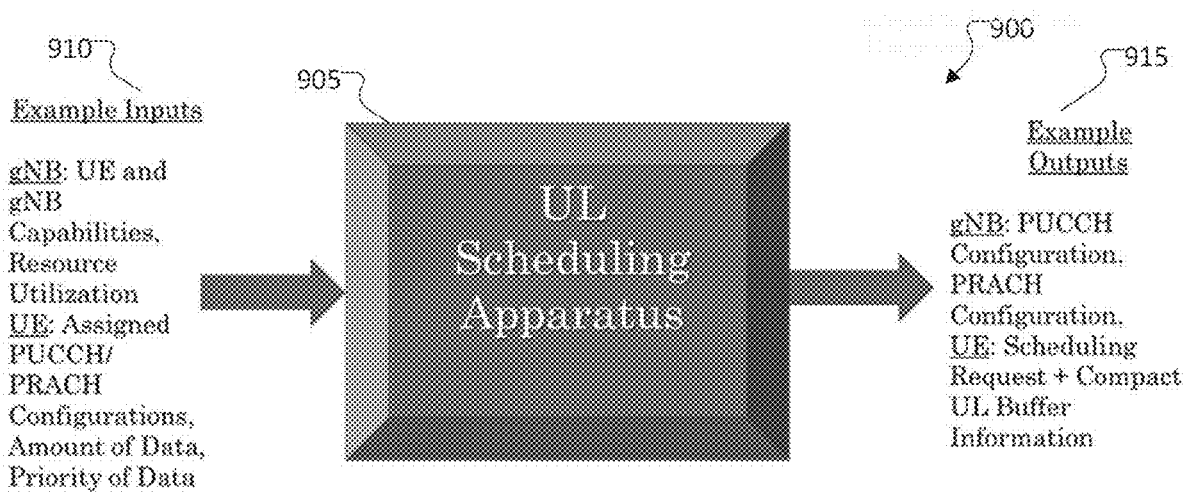
FIG. 9 illustrates an example overall an uplink scheduling mechanism according to embodiments of the present disclosure.

FIG. 9 illustrates an example overall UL Scheduling Mechanism according to embodiments of the present disclosure. An embodiment of the overall mechanism 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In the example shown in FIG. 9, example inputs and outputs of an implementation-specific resource management algorithm at an eNB/gNB 103 that reduces the user traffic interruptions. In the example shown in FIG. 9, an uplink scheduling processor 905 receives, from gNB 103, UE 116 and gNB 103 capabilities, and resource utilization, and receives, from UE 116, assigned PUCCH/PRACH Configurations, amount of data, and priority of data 910. The Uplink Power control processor 905 outputs, to gNB 103, Configuration and PRACH Configuration, and outputs, to UE 116, Scheduling Request and Compact UL Buffer Information 915.

In certain embodiments, gNB 103 uses inputs such as UE capabilities and BS capabilities, and resource utilization to determine the PUCCH and/or PRACH radio resource configurations for UE 116. UE 116 utilizes a suitable PRACH/PUCCH resource based on the status of its UL buffer to convey to gNB 103 a Scheduling Request (SR) and the status of its UL buffer.

Figure 10:
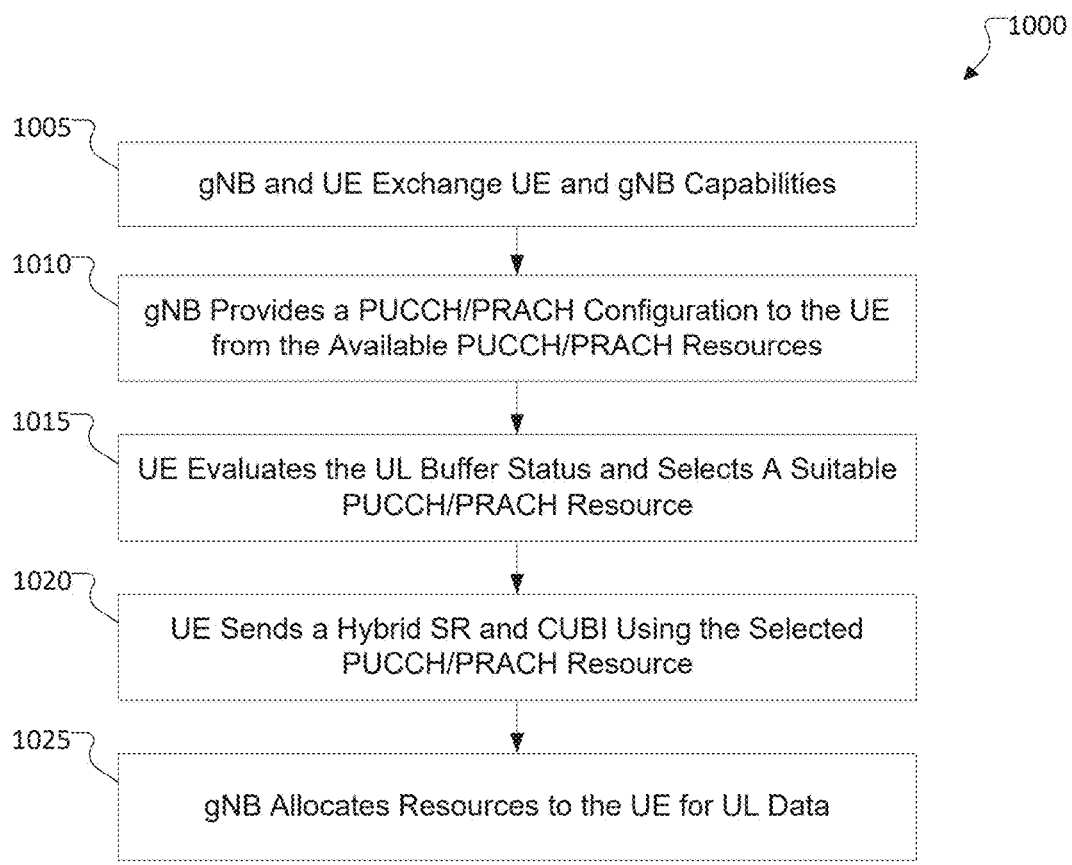
FIG. 10 illustrates an example process for flexible QoS according to embodiments of the present disclosure.

FIG. 10 illustrates an example process for flexible QoS according to embodiments of the present disclosure. An embodiment of the overall steps 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In operation 1005, a serving gNB 103 and UE 116 exchange capabilities regarding the support for new PUCCH/PRACH enhancements related to UL scheduling.

In operation 1010, serving gNB 103 evaluates the availability of radio resources in the UE's 116 serving cell and determines suitable PUCCH/PRACH configurations for the UE's 116 UL scheduling. Serving gNB 103 conveys such PUCCH/PRACH configurations to UE 116 via a message such as RRC Reconfiguration.

In operation 1015, when the UE's 116 UL buffer receives data to transmit but does not have any PUSCH resources to send such data, UE 116 chooses a suitable PUCCH/PRACH resource or configuration to convey the Scheduling Request (SR) and regular Buffer Status Report (BSR) or Compact Uplink Buffer Information (CUBI). The CUBI is a compact or simplified version of a regular BSR.

In operation 1020, UE 116 sends hybrid SR and BSR/CUBI to the serving cell using the selected PUCCH/PRACH resource.

In operation 1025, serving gNB 103 evaluates the BSR/CUBI received from UE 116 and allocates UL resources to UE 116 using a suitable scheduling method such as dynamic scheduling, where a DCI is used to convey the resource allocation.

FIG. 10 outlines example steps of one of the embodiments of the invention to reduce the UL scheduling delay. Details of the UE-network signaling and the UE procedure are provided in FIGS. 11 and 12, respectively.

Figure 11:
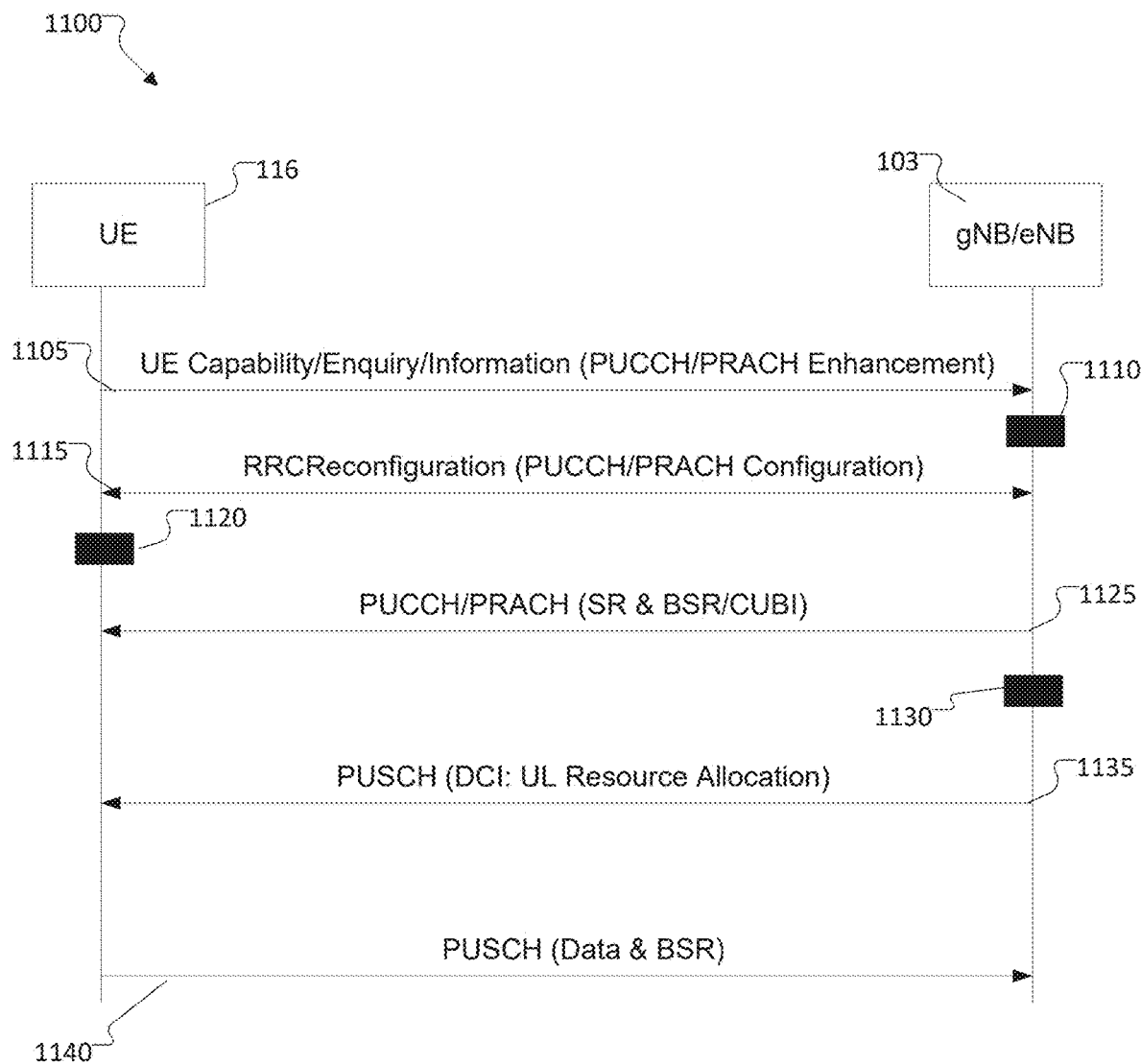
FIG. 11 illustrates an example signaling for UE-Network Procedures according to embodiments of the present disclosure.

FIG. 11 illustrates an example signaling for UE-Network Procedures according to embodiments of the present disclosure. An embodiment of the signaling flow for UE-radio network interactions 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. In the example shown in FIG. 11, operations by and signaling between UE 116 and gNB 103.

In the example shown in FIG. 11, in one approach, gNB 103 and UE 116 exchange capabilities 1105 related to the use of PUCCH and/or PRACH resource configurations to convey the UL buffer status information from UE 116 to gNB 103. In another approach, the use of PUCCH and/or PRACH resource configurations to support enhanced UL scheduling may be mandatory for UE 116 to support.

In certain embodiments, in operation 1110, gNB 103 evaluates available PUCCH and/or radio resources for UL SR and BSR/CUBI and determines a set of PUCCH/PRACH resources for UE 116 to enable UE 116 to choose one such resource when UE 116 wants to convey hybrid SR and BSR/CUBI to the serving cell. The details of (i) the CUBI and (ii) PUCCH resource configurations, and (iii) PRACH configurations are further described herein below.

In certain embodiments, gNB 103 configures 1115 UE 116 with a set of suitable PUCCH/PRACH resources that UE116 can choose from to convey hybrid SR and BSR/CUBI using an RRC Reconfiguration message. The gNB 103 may specify to UE 116 (i) PUCCH resource configurations only, (ii) PRACH configurations only, or (iii) both PUCCH and PRACH configurations to UE 116. Furthermore, in certain embodiments, gNB 103 may also specify if UE 116 needs to send BSR only, CUBI only, or any of BSR and CUBI.

In operation 1120, UE 116 checks if its UL buffer has data to transmit and if UE 116 has been allocated PUSCH resources to send such data. If UE 116 needs to send UL data but does not have PUSCH resources, UE 116 chooses a suitable PUCCH/PRACH resource or configuration to convey the hybrid SR and BSR/CUBI. In certain embodiments, if gNB 103 has allocated PUCCH resource configurations only, UE 116 considers allocated PUCCH resource configurations to select a PUCCH resource configuration that reflects the UL buffer status. In another approach, if gNB 103 has allocated PRACH resource configurations only, UE 116 considers allocated PRACH resource configurations to select a PRACH resource configuration that reflects the UL buffer status. In certain embodiments, if gNB 103 has allocated both the PUCCH resource configurations and the PRACH resource configurations, UE 116 considers both the allocated PUCCH resource configurations and the allocated PRACH resource configurations to choose a PUCCH or PRACH resource. For example, when a UE is provided N PUCCH/PRACH configurations for SR transmission, a selection of a PUCCH/PRACH configuration provides $\log_2$ (N) bits for a BSR.

In response, UE 116 sends a signal 1125 with (i) hybrid SR and BSR or (ii) hybrid SR and CUBI to the serving cell, namely gNB 103, using the selected PUCCH/PRACH resource according to the configuration specified by gNB 103 in configuration 1115.

In operation 1130, gNB 103 evaluates the hybrid SR and BSR/CUBI received from UE 116 and determines the amount of UL resources to allocate to UE 116 and a suitable scheduling method to convey the UL radio resource allocation. Examples of scheduling methods include dynamic scheduling, configured scheduling, and semi-persistent scheduling.

When gNB 103 has chosen dynamic scheduling in operation 1130, gNB 103 uses a DCI on a PDCCH to convey 1135 the resource allocation.

In response, UE 116 transmits 1140 the UL data to the serving cell, namely gNB 103. In an example approach, UE 116 also transmits a regular BSR along with data, especially when UE 116 has sent a CUB in signal 1125.

A CUBI

A typical short BSR contains ID of the highest priority logical channel group (LCG) and 5 bits representing the amount of data.

In certain embodiments, the BSR information is condensed to create a CUBI. A CUBI aims to represent the UL Buffer Status Information using fewer bits than the original BSR. The goal of CUBI is to reduce the number of bits compared to a regular BSR while giving gNB 103 adequate information to allocate fewer or more resources for the uplink transmission from the UE.

In certain embodiments, a new table with fewer options of the amount of data is created. Instead of 32 options in the table (which needs 5 bits), if there are 4 options, only two bits would suffice. In certain embodiments, out of the 32 options in the existing table of the specifications, a subset of options is selected, such as 4 or 8 options.

In certain embodiments, X bits can convey information about the highest priority logical channel group (LCG), Y bits can represent the amount of data for the highest priority LCG, and Z bits can represent the combined amount of data across all LCGs. In certain embodiments, the information conveyed by a CUBI may include: (i) Y bits only, (ii) Z bits only, (iii) X bits and Y bits, and (iv) X bits and Z bits. In options (iii) and (iv), 1-bit X may indicate if the amount of data being reported belongs to the highest priority LCG only or not.

In certain embodiments, gNB 103 can explicitly specify thresholds to UE 116 so that the UE can compare the amounts of data with such thresholds and convey the amount of data using a suitable bit combination.

PUCCH Resource Configurations

In certain embodiments, a specific PUCCH resource configuration among the set of allocated PUCCH resource configurations is used by UE 116 to indirectly convey (i) the hybrid SR and BSR or (ii) the hybrid SR and CUBI. Let (i) or (ii) be referred to as Uplink Buffer Status Information (UBSI).

In certain embodiments, the UBSI is represented by a "PUCCH sequence." A total of N PUCCH sequences would be needed per UE when the number of UBSI values is N, or when the UGSI length is $Log_2(N)$ bits. In one approach, to support N sequences per UE for a large of RRC_CONNECTED UEs, the number of groups is increased (i.e., more than 30 groups supported in R16). In an example approach, different groups can be used to create N different sequences. At a given instant, one PUCCH sequence is selected by UE 116 in operation 1120 to convey a UBSI value.

In certain embodiments, the UBSI is represented by the SR sequence that utilizes QPSK modulation. This will enable UE 116 to represent four different UBSI values, because a QPSK modulation symbol has two bits. A modulated SR transmission can also increase a number of bits that can be provided using a predetermined number of sequences. For example, even with a single sequence, a QPSK modulation can provide indication for 2 bits of BSR/4 UBSI values. The UE may not transmit a SR when the UE does not have data in its buffer and can transmit a SR using QPSK modulation when the UE has data in its buffer.

In certain embodiments, the UBSI is represented by the SR sequence that utilizes QPSK modulation. This will enable UE 116 to represent four different UBSI values, because a QPSK modulation symbol has two bits.

In certain embodiments, the UBSI is represented by re-purposing a PUCCH format that usually carries ACK/NACKs in response to the transport blocks received in the DL. In such case, four different ACK/NACK combinations can represent 4 different UBSI values.

In certain embodiments, the UBSI is represented by an SR resource. For example, one SR resource may represent one UBSI value, and another SR resource may represent another UBSI value.

In certain embodiments, the UBSI is represented by combinations of a cyclic shift and a Walsh cover. For example, one combination of a cyclic shift and a Walsh cover may represent one UBSI value, and another combination of a cyclic shift and a Walsh cover may represent another UBSI value.

In certain embodiments, the UBSI is represented by a re-purposed PUCCH format that can carry more bits (e.g., PUCCH Formats 3 and 4). Instead of conveying the regular content (e.g., HARQ ACK/NACKs and CSI), the PUCCH format carries the UBSI.

In certain embodiments, one or more of the methods mentioned above can be combined to represent a UBSI value.

A PRACH Configuration

In certain embodiments, a specific PRACH resource configuration among the set of allocated PRACH resource configurations is used by UE 116 to indirectly convey (i) the hybrid SR and BSR or (ii) the hybrid SR and CUBI.

In an example approach, dedicated RA preambles represent UBSI values. For example, a first dedicated RA preamble may represent a first UBSI value, and a second dedicated RA preamble may represent a second UBSI value. These preambles are different from preambles typically used in a cell for contention based random access (CBRA) and contention free random access (CFRA). For example, the CBRA and CFRA preambles are generated using Root Sequence Index (RSI)=X and Y, while the dedicated preamble for the UBSI are generated using different RSIs=A and B. In certain embodiments, different time-frequency resources of PRACHs can represent different UBSIs.

Figure 12:
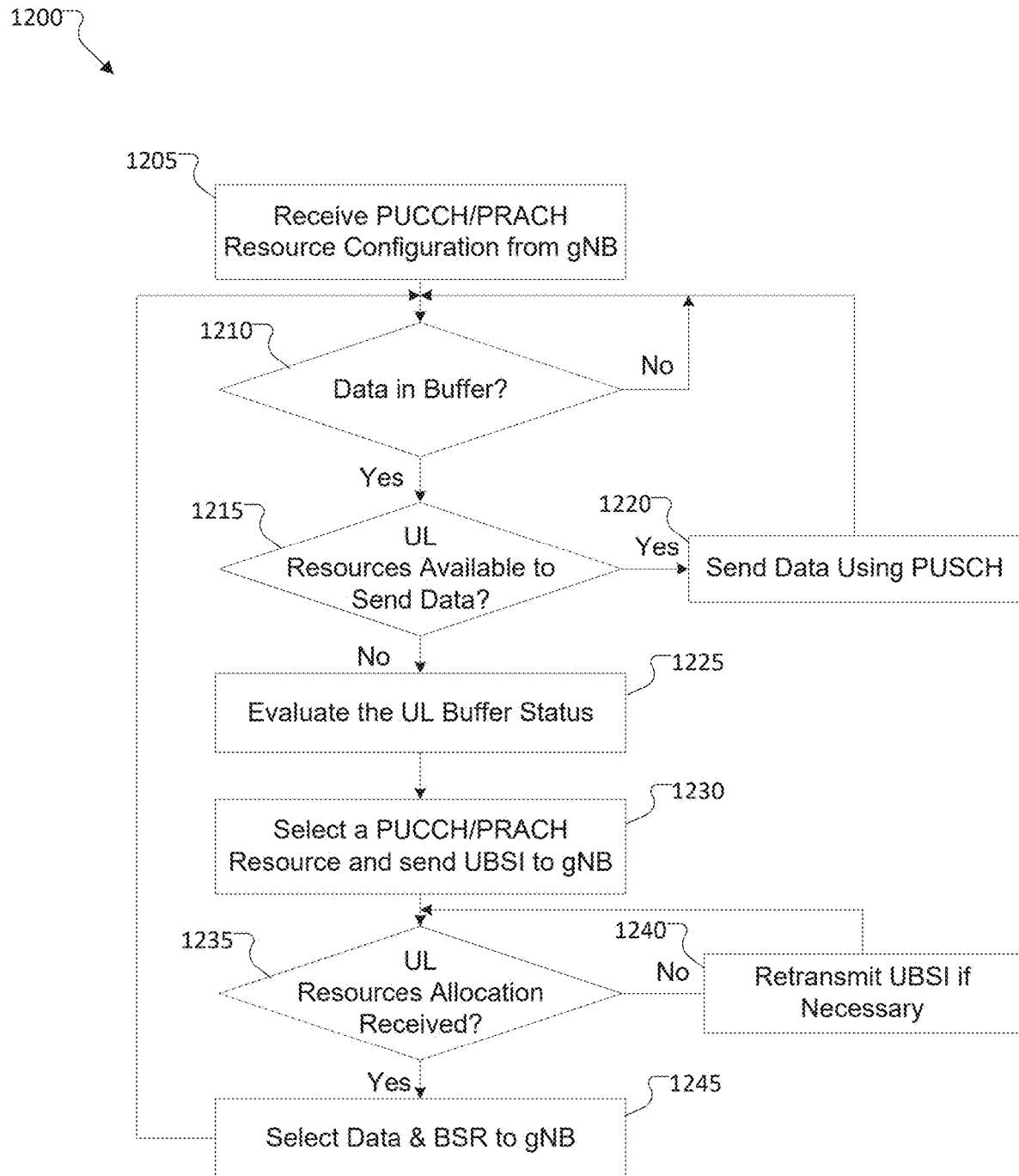
FIG. 12 illustrates an example process for UE uplink scheduling according to embodiments of the present disclosure.

FIG. 12 illustrates an example process for UE uplink scheduling according to embodiments of the present disclosure. An embodiment of the overall steps 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In operation 1205, UE 116 receives one of the following resource configurations from gNB 103 in an RRC Reconfiguration message in support of enhanced UL scheduling: (i) PUCCH resources only, (ii) PRACH resources only, and (iii) both PUCCH resources and PRACH resources. In operation 1210, UE 116 checks if new data has arrived in its UL buffer. If not, UE 116 repeats operation 1210 until new data has arrived in the UE 116 UL buffer. When UE 116 determines that new data has arrived in the UE 116 UL buffer, UE 116 proceeds to operation 1215 in which UE 116 checks UL resources have been allocated by gNB 103 to send data. When UL resources have been allocated, UE 116 transmits the data using a physical uplink shared channel (PUSCH) in operation 1220. Thereafter, UL 116 returns to operation 1210 to check whether new data has arrived in the UE 116 UL buffer. When UL resources have not been allocated, UE 116 evaluates its UL buffer status in operation 1225. In particular, UE 116 checks for the priorities of the LCGs and amounts of data for each LCG and the total amount of data across all LCGs. In operation 1230, UE 116 selects a PUCCH resource or a PRACH resource based on the configuration received from gNB 103. UE 116 sends the UBSI to gNB 103 using the selected PUCCH/PRACH resource. In operation 1235, UE 116 checks whether UE 116 has received any UL resource allocation from gNB 103, such as the one specified in a DCI. If UE 116 has not received an UL resource allocation from gNB 103, UE 116 retransmits a UBSI in operation 1240, if necessary and returns to operation 1235 to check whether UE 116 has received any UL resource allocation from gNB 103. When UE 116 has received an UL resource allocation from gNB 103, UE 116 proceeds to operation 1245 in which UE 116 sends UL data and a BSR using the allocated PUSCH resources. Thereafter, UE 116 again returns to operation 1210 to check whether new data has arrived in the UE 116 UL buffer.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive a set of power management parameters; and
   a processor configured to:
     determine a synchronization signal block (SSB) associated with a reception point;
     select, based on the SSB, power management parameters from the set of power management parameters; and
     determine a power based on the power management parameters,
   wherein the transceiver is further configured to transmit a signal to the reception point using the power.

2. The UE of claim 1, wherein:
   the set of power management parameters are based on a type of the reception point,
   the processor is further configured to select:
     a predictive transmit power method when the reception point is a non-terrestrial network (NTN), and
     a non-predictive transmit power method when the reception point is a terrestrial network (TN).

3. The UE of claim 1, wherein:
   the set of power management parameters are based on a type of the reception point, and
   the processor is further configured to select:
     a predictive transmit power method when the reception point is a low earth orbit (LEO) network, and
     a non-predictive transmit power method when the reception point is a geosynchronous earth orbit (GEO) network.

4. The UE of claim 2, wherein:
   the processor is configured to select:
     the non-predictive transmit power method when a time difference between a reception of the SSB and a reference time is larger than a threshold; or
     select the predictive transmit power method when the time difference between the SSB reception and a reference time is not larger than the threshold; and
   the threshold is predetermined or is indicated by higher layer signaling.

5. The UE of claim 1, wherein:
   the processor is configured to use a path loss estimation and an adjustment value to adjust a path loss, and
   the adjustment value is a function of a time difference between:
     an instant of a synchronization signal block (SSB) reception, and
     a power reference point or a distance between the UE and the reception point.

6. The UE of claim 2, wherein the transceiver is further configured to transmit an indication for a capability for the predictive transmit power method.

7. The UE of claim 1, wherein:
   the set of power management parameters are based on a type of the reception point,
   when a time difference between a reception of the SSB and a reference time is larger than a threshold, the set of power management parameters are non-predictive,
   when the time difference between the SSB reception and the reference time is not larger than the threshold, the set of power management parameters are predictive, and
   the threshold is predetermined or is indicated by higher layer signaling.

8. A base station (BS) in a wireless communication system, the BS comprising:
   a processor configured to:
     obtain a set of power management parameters, the power management parameters comprising at least one of a power reference point, wherein the power reference point is one of a base station, an NTN gateway (GW), or an NTN platform;
     receive power adjustments relating to long term fading, quality of radio connection, and quality of service;
     determine, based on the set of power management parameters, a power transmit level; and
     generate a power transmit message comprising the power transmit level; and
   a transceiver operably connected to the processor, the transceiver configured to:
     transmit, to a user equipment (UE), the power transmit message configured to enable the UE to:
       determine a synchronization block (SSB) associated with a reception point,
       select, based on the SSB, power management parameters from the set of power management parameters;
       determine a power based on the power management parameters; and
       transmit a signal to the reception point using the power.

9. The BS of claim 8, wherein:
   the set of power management parameters are based on a type of the reception point, and
   the power transmit message is further configured to enable the UE to:
     select a predictive transmit power method when the reception point is a non-terrestrial network (NTN), and
     select a non-predictive transmit power method when the reception point is a terrestrial network (TN).

10. The BS of claim 9, wherein the transceiver is configured to:
- receive power amplifier gains applied to a first signal received on an access link or a service link by the reception point;
- receive the power amplifier gains applied to a second signal received on a feeder link by the reception point; and
- receive the power amplifier gains applied to the second signal received on the feeder link by a gateway.

11. The BS of claim 9, wherein:
the power transmit message is further configured to enable the UE to select:
- the non-predictive transmit power method when a time difference between a reception of the SSB and a reference time is larger than a threshold; or
- the predictive transmit power method when the time difference between the SSB reception and a reference time is not larger than the threshold, and
the threshold is predetermined or is indicated by higher layer signaling.

12. The BS of claim 8, wherein:
the processor is configured to estimate a path loss adjustment value, wherein the estimated path loss adjustment value is a function of shadow fading, and
the transceiver is further configured to transmit the estimated path loss adjustment value.

13. The BS of claim 8, wherein:
the set of power management parameters are based on a type of the reception point,
when a time difference between a reception of the SSB and a reference time is larger than a threshold, the set of power management parameters are non-predictive,
when the time difference between the SSB reception and the reference time is not larger than the threshold, the set of power management parameters are predictive, and
the threshold is predetermined or is indicated by higher layer signaling.

14. A method of a user equipment (UE) a wireless communication system, the method comprising:
- receiving a set of power management parameters;
- determining a synchronization signal block (SSB) associated with a reception point;
- selecting, based on the SSB, power management parameters from the set of power management parameters;
- determining a power based on the power management parameters; and
- transmitting a signal to the reception point using the power.

15. The method of claim 14, wherein:
the set of power management parameters are based on a type of the reception point, and
the method further comprises:
- selecting a predictive transmit power method when the reception point is a non-terrestrial network (NTN), and
- selecting a non-predictive transmit power method when the reception point is a terrestrial network (TN).

16. The method of claim 14, wherein:
the set of power management parameters are based on a type of the reception point,
the method further comprises:
- selecting a predictive transmit power method when the reception point is a low earth orbit (LEO) network;
- selecting a non-predictive transmit power method when the reception point is a geosynchronous earth orbit (GEO) network;
- selecting the non-predictive transmit power method when a time difference between a reception of the SSB and a reference time is larger than a threshold; and
- selecting the predictive transmit power method when the SSB reception and a reference time is not larger than the threshold, and
the threshold is predetermined or is indicated by higher layer signaling.

17. The method of claim 15, further comprising using a path loss estimation and an adjustment value to adjust a path loss, wherein the adjustment value is a function of a time difference between an instant of a synchronization signal block (SSB) reception and a power reference point or a distance between the UE and the reception point.

18. The method of claim 15, further comprising transmitting an indication for a capability for the predictive transmit power method.

19. The method of claim 14, wherein:
the set of power management parameters are based on a type of the reception point,
when a time difference between a reception of the SSB and a reference time is larger than a threshold, the set of power management parameters are non-predictive,
when the time difference between the SSB reception and the reference time is not larger than the threshold, the set of power management parameters are predictive, and
the threshold is predetermined or is indicated by higher layer signaling.

* * * * *